United States Patent
Tang et al.

(10) Patent No.: US 11,936,278 B2
(45) Date of Patent: Mar. 19, 2024

(54) FAN BRAKING STRUCTURE

(71) Applicant: ASIA VITAL COMPONENTS CO., LTD., New Taipei (TW)

(72) Inventors: Chih-Cheng Tang, New Taipei (TW); Hao-Yu Chen, New Taipei (TW); Hsu-Jung Lin, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 18/138,128

(22) Filed: Apr. 24, 2023

(65) Prior Publication Data
US 2024/0048023 A1 Feb. 8, 2024

(30) Foreign Application Priority Data
Aug. 2, 2022 (TW) .................................. 111128989

(51) Int. Cl.
*H02K 7/102* (2006.01)
*H02K 7/14* (2006.01)

(52) U.S. Cl.
CPC ............. *H02K 7/1023* (2013.01); *H02K 7/14* (2013.01)

(58) Field of Classification Search
CPC ...... F04D 19/002; F04D 29/05; F04D 29/058; F04D 29/143; H02K 7/10–1085; H02K 7/14; H02K 23/68; H02K 27/30; H02K 49/10
See application file for complete search history.

(56) References Cited

U.S. PATENT DOCUMENTS

| 10,422,347 B2 * | 9/2019 | Sun .................. F04D 29/522 |
| 2017/0314411 A1 | 11/2017 | Roberge |
| 2023/0089823 A1 * | 3/2023 | Uematsu .............. H02K 7/1025 |

FOREIGN PATENT DOCUMENTS

| CN | 102916401 A |   | 2/2013 |            |
| CN | 207377470 U |   | 5/2018 |            |
| CN | 109274194 A | * | 1/2019 | ...... H02K 5/04 |
| CN | 111140521 A |   | 5/2020 |            |
| TW | I605198 B   |   | 11/2017 |           |
| TW | M634982 U   |   | 12/2022 |           |

OTHER PUBLICATIONS

English Translation of CN-109274194-A (Year: 2019).*
Search Report dated Mar. 31, 2023 issued by Taiwan Intellectual Property Office for counterpart application No. 111128989.

* cited by examiner

*Primary Examiner* — Brian P Wolcott
(74) *Attorney, Agent, or Firm* — Bradley J. Thorson; DeWitt LLP

(57) ABSTRACT

A fan braking structure includes a fan including a frame having an upright bearing cup, and a fan impeller having a vertical rotating shaft pivotally received in the bearing cup and provided at a free end with a groove; a braking structure located at a lower part of the bearing cup and including a brake plate and an electromagnet, and the brake plate being provided at one side with a protruded brake pin and at another side with a magnetic member; and an elastic element disposed between and pressed against the brake plate and the electromagnet. When the fan is powered off, the electromagnet is energized and produces magnetic poles that magnetically repel the magnetic member, such that the brake pin is pushed by a magnetic force and the elastic element toward the rotating shaft to engage with the groove, causing the fan to brake and stop rotating inertially.

5 Claims, 3 Drawing Sheets

FAN BRAKING STRUCTURE

This application claims the priority benefit of Taiwan patent application number 111128989 filed on Aug. 2, 2022.

FIELD OF THE INVENTION

The present invention relates to a fan braking structure, and more particularly, to a fan braking structure that can be repeatedly actuated to brake a fan and is universally usable with all types of fans.

BACKGROUND OF THE INVENTION

Many products produce heat when they are in use, and the produced heat tends to accumulate in the products during the operation thereof. The accumulated heat would adversely affect the products and lead to poor performance and reduced efficiency. Therefore, it is necessary to provide a heat dissipation device in these products. Generally, a fan is used as the heat dissipation device. When a relatively high temperature is reached in a product, the fan provided in the product is actuated to expel hot air from the product and to lower an overall internal temperature of the product. And, when the internal temperature of the product lowers to a preset relatively low temperature, the fan is powered off to reduce energy consumption. However, even when the fan is powered off, its original rotation speed would bring it to rotate inertially for a while before it becomes completely still.

To minimize the duration of inertial rotation of the power-off fan, different fan braking structures have been developed. Currently, there are two types of fan braking structures available for use. When using the first type of fan braking structure to brake a fan, a logic circuit of the fan is controlled by software to a normally open state, and a magnetic field produced when the fan blades rotate repels a magnetic field produced by a magnetic belt in the fan to produce a resistive force that reduces the time of inertial rotation of the fan after it is powered off. When using the second type of fan braking structure to brake a fan, an electromotive force produced by the inertial rotation of the fan blades after the fan is powered off is transmitted to a hardware braking circuit, so as to drive a fan logic circuit to a normally open state; and a magnetic field produced by the inertial rotation of the fan blades repels a magnetic field produced by a magnetic belt in the fan to produce a resistive force that reduces the time of inertial rotation of the fan after it is powered off.

From the above description, it can be found the currently available fan braking structures require an additional software-controlled login circuit or a particularly designed hardware braking circuit for driving the fan logic circuit, so that the magnetic field produced by the operating fan blades repels the magnetic field produced by the magnetic belt to produce the resistive force for shortening the time of inertial rotation of the power-off fan to achieve the braking effect. That is, for general fans to mount any of the currently available fan braking structures, it is necessary to include an additional braking circuit to achieve the braking effect. However, since the printed circuit board of the fan generally already has had a variety of densely distributed wirings printed on, it would be difficult to further add the braking circuit or the driving logic circuit to the originally designed circuit board; and the related manufacturers have to design a new circuit board to achieve the function of shortening the inertial rotation time of the power-off fan. Therefore, the currently available fan braking structures are not universally usable with all types of fans.

SUMMARY OF THE INVENTION

A primary object of the present invention is to provide a fan braking structure that is universally usable with all types of fans.

To achieve the above and other objects, the fan braking structure according to the present invention includes a fan, a braking structure, and an elastic element. The fan includes a frame, a fan impeller and a stator. The frame includes an upright bearing cup, and the stator is externally fitted around the bearing cup to be located corresponding to the fan impeller. The fan impeller includes a rotating shaft vertically received in the bearing cup, an end of the rotating shaft is pivotally received in the bearing cup, and another end of the rotating shaft is a free end having a groove formed thereat. The braking structure includes a regenerative module and a shell located at a lower part of the bearing cup. The shell of the braking structure is internally provided with a brake plate and an electromagnet; the brake plate is provided at one side with a protruded brake pin and at another opposite side with a magnetic member, and the brake pin is located corresponding to the groove formed at the free end of the rotating shaft. The elastic element is disposed between and pressed against the brake plate and the electromagnet.

When the fan operates in a normal state, no electricity is supplied to the electromagnet. At this point, the magnetic member located at another side of the brake plate is magnetically attracted by the electromagnet to thereby move the brake plate toward the electromagnet, such that the elastic element disposed between the brake plate and the electromagnet is elastically compressed. Since the magnetically attractive force between the magnetic member and the electromagnet is larger than the elastic force of the elastic element, the brake plate and the brake pin located at one side thereof are pulled away from the groove provided at the free end of the rotating shaft, allowing the fan to rotate smoothly.

On the other hand, when the fan is powered off, the regenerative module charges the electromagnet, so that the electromagnet has an electric current supplied thereto to produce magnetic poles. At this point, the electromagnet produces a reverse magnetic force repelling the magnetic member that is initially magnetically attracted to the electromagnet. Meanwhile, the initially compressed elastic element releases its elastic force, which together with the magnetic repelling force pushes the magnetic member and the brake plate toward the rotating shaft until the brake pin on the brake plate is correspondingly engaged with the groove at the free end of the rotating shaft of the fan. With the engagement of the brake pin with the groove, the power-off fan can reduce or even avoid the time of inertial rotation to achieve improved braking effect. The fan braking structure of the present invention can be applied to general fans so long as the fans have a groove provided at the free end of their rotating shaft. Therefore, the present invention has the advantage of being universally usable with any type of existing fans.

BRIEF DESCRIPTION OF THE DRAWINGS

The structure and the technical means adopted by the present invention to achieve the above and other objects can

DETAILED DESCRIPTION OF THE PREFERRED EMBODIMENTS

The present invention will now be described with a preferred embodiment thereof.

Figure 1:
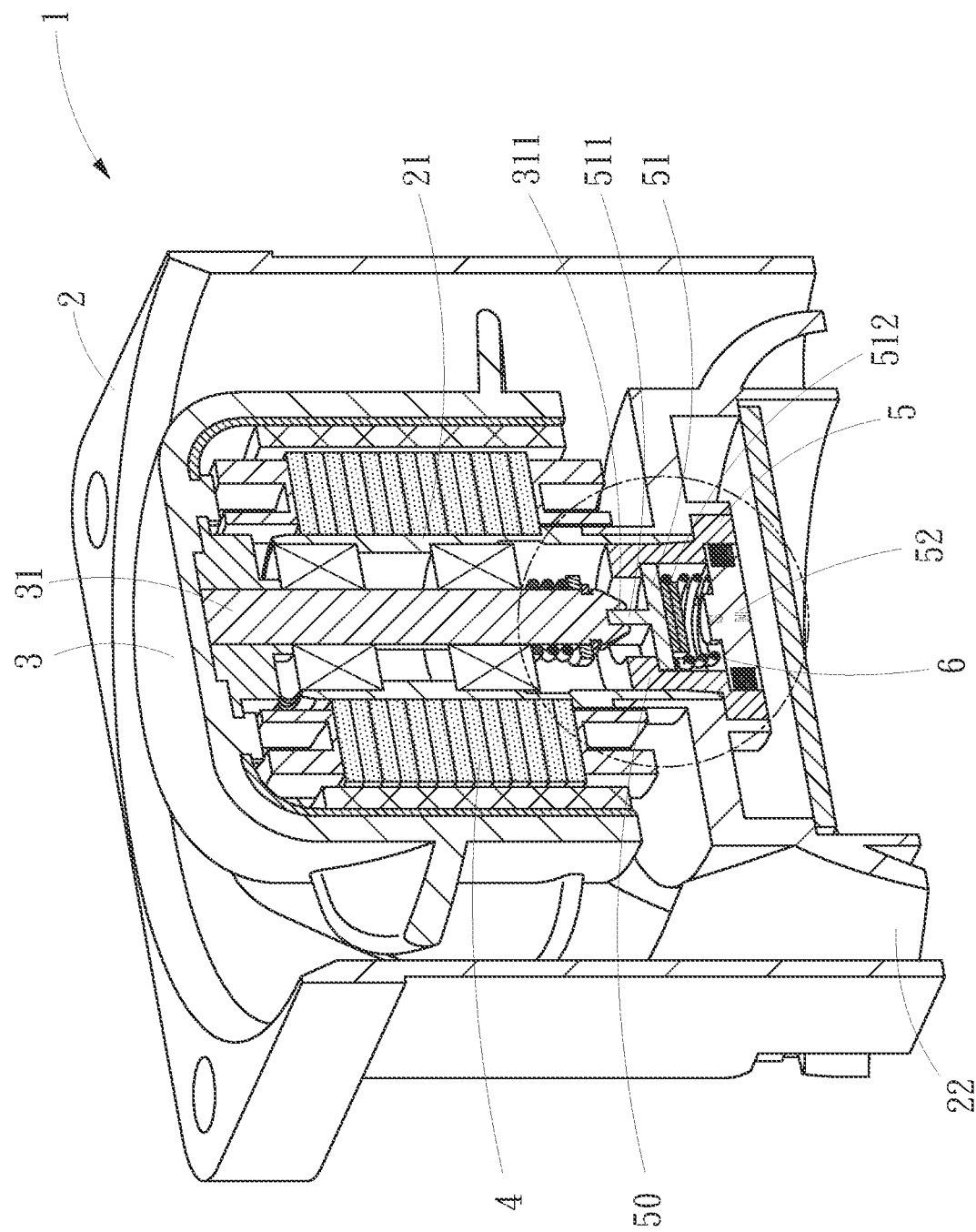
FIG. 1 is a cutaway view of a fan braking structure according to a preferred embodiment of the present invention.
Figure 3:
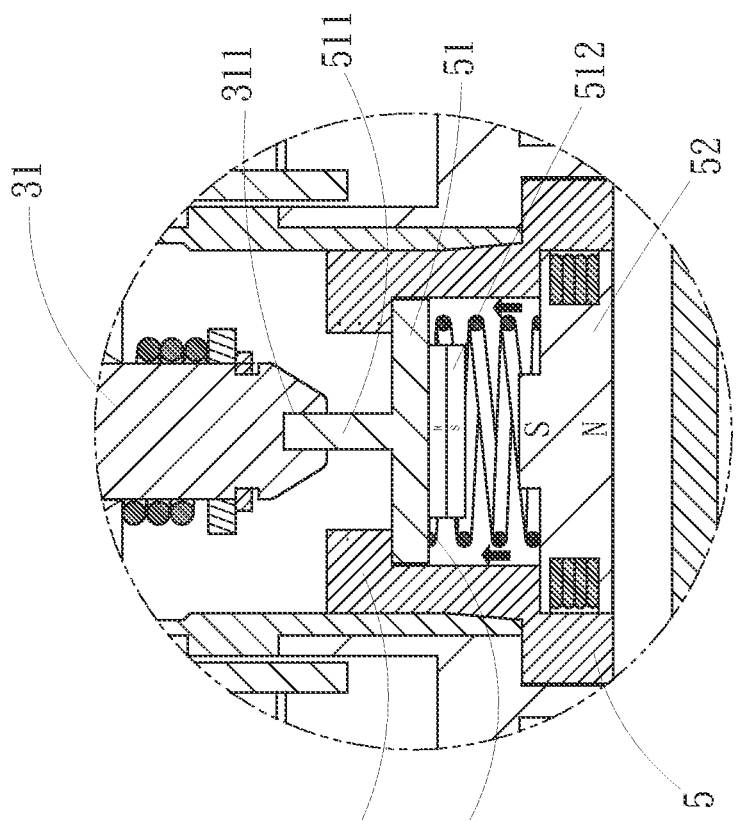
FIG. 3 is a fragmentary, sectional view showing the state of the fan braking structure of FIG. 1 when the fan using it is powered off.
Figure 2:
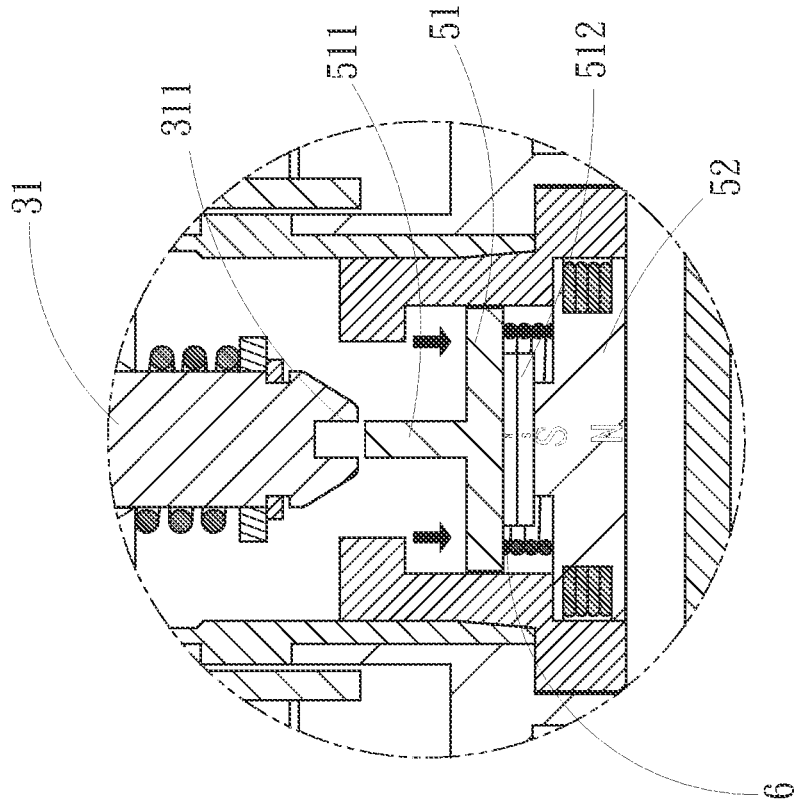
FIG. 2 is a fragmentary, sectional view showing the state of the fan braking structure of FIG. 1 when a fan using it is in normal operation.

Please refer to FIG. 1, which is a cutaway view of a fan braking structure according to a preferred embodiment of the present invention, and to FIGS. 2 and 3, which are fragmentary sectional views showing the state of the fan braking structure of FIG. 1 when a fan using it is in a normal operating state and a power-off state, respectively. As shown, the fan braking structure includes a fan 1, a braking structure 5, and an elastic element 6. The fan braking structure of the present invention is characterized in that, when the fan 1 is powered off, the braking structure 5 can be activated for a brake pin 511 thereof to engage with a groove 311 formed at a free end of a rotating shaft 31 of the fan 1; and at this point, a resistive force is generated to brake the fan 1, so as to reduce the inertial rotation time of the fan 1 in the power-off state. Further, the fan braking structure of the present invention has the advantage that it can be universally used with all types of fans, so long as the fans have a rotating shaft with a groove formed at a free end thereof.

According to the present invention, the fan 1 includes a frame 2, a fan impeller 3, and a stator 4. The frame 2 includes an upright bearing cup 21; the stator 4 is externally fitted around the bearing cup 21 to be located corresponding to the fan impeller 3. The fan impeller 3 includes the above-mentioned rotating shaft 31, which is vertically received in the bearing cup 21 with an end thereof pivotally received the bearing cup 21; and another end of the rotating shaft 31 is a free end having the above-mentioned groove 311 formed thereat.

Preferable, the frame 2 internally includes a plurality of blades 22, which are respectively connected at one end to the frame 2 and at another end to the bearing cup 21.

Figure 4:
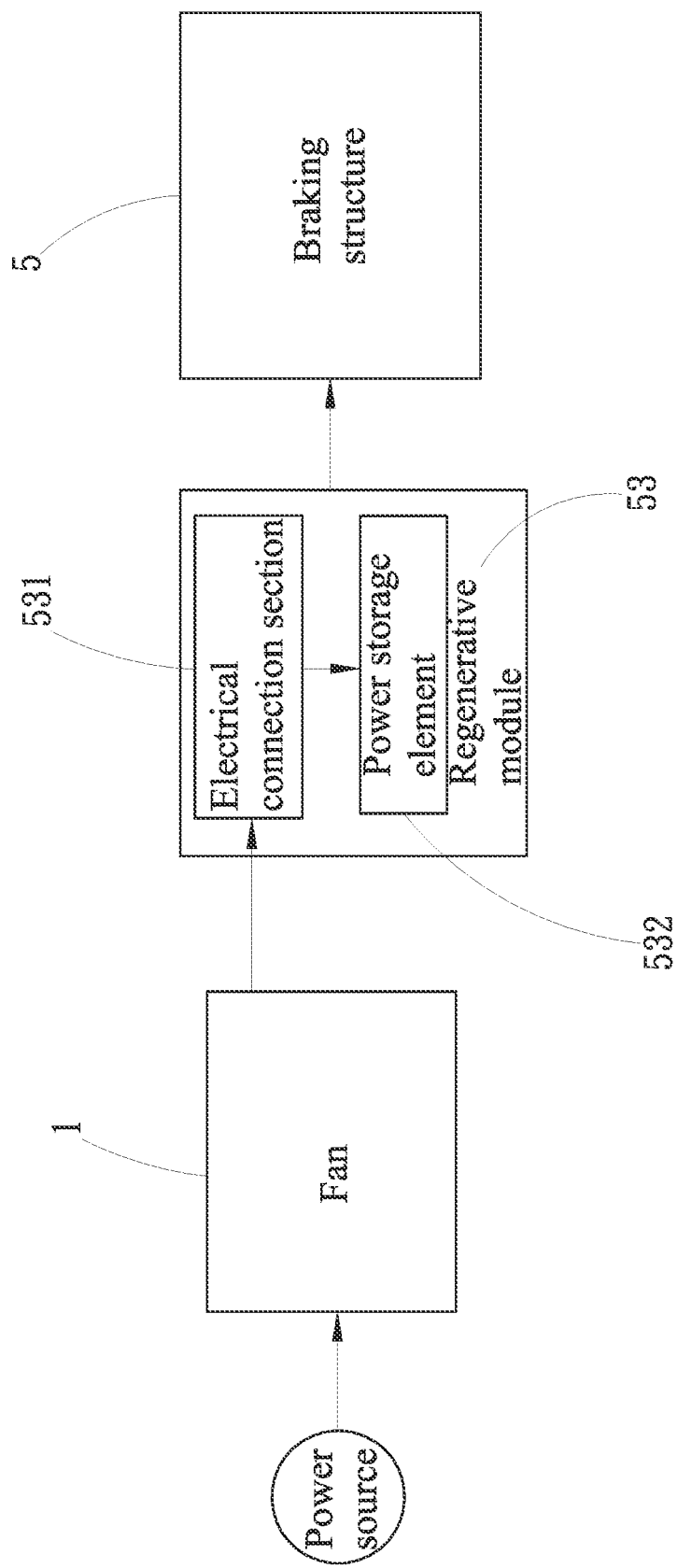
FIG. 4 is a flow chart showing the action process of a regenerative module of the fan braking structure of the present invention.

Please refer to FIGS. 1 and 4. The braking structure 5 includes a regenerative module 53 and a shell 50 located at a lower part of the bearing cup 21. The shell 50 of the braking structure 5 is internally provided with a brake plate 51 and an electromagnet 52. The above-mentioned brake pin 511 is formed on and protruded from one side of the brake plate 51 facing toward the rotating shaft 31 and is located corresponding to the groove 311 formed at the free end of the rotating shaft 31. A magnetic member 512 is provided on another opposite side of the brake plate 51. The regenerative module 53 includes an electrical connection section 531 and a power storage element 532. The electrical connection section 531 is electrically connected to the fan 1.

The elastic element 6 is disposed between and pressed against the brake plate 51 and the electromagnet 52.

Preferably, the brake pin 511 and the groove 311 have mating geometrical configurations to be fitly and detachably engaged with each other. For example, the brake pin 511 may be rectangular, polygonal or triangular in shape, while the groove 311 is correspondingly shaped.

Preferably, the elastic element 6 is a compression spring or a conical spring.

Preferably, the magnetic member 512 is a permanent magnet.

Preferably, the shell 50 of the braking structure 5 has a non-circular internal spatial shape and the brake plate 51 has a corresponding non-circular external shape. For example, the brake plate 51 may be rectangular, polygonal or triangular in shape, while the shell 50 has a corresponding rectangular, polygonal or triangular internal spatial shape. With this arrangement, it is able to prevent the brake plate 51 from rotating radially while moving axially in the shell 50.

The electrical connection section 531 may be a pin socket, a flat cable, a wire, or an electrical contact. The power storage element 532 may be a capacitor, a battery, or an accumulator to serve as a device for storing and releasing electricity. When the fan 1 operates in a normal power supply condition, the power storage element 532 is electrically connected to the fan 1 via the electrical connection section 531 and stores electricity at the same time. On the other hand, when the fan 1 is powered off, the power storage element 532 releases the stored electricity to the electromagnet 52.

Please refer to FIG. 2, which is a fragmentary, sectional view showing the state of the fan braking structure when the fan 1 operates in a normal state. However, it is noted that the dashed letters S and N shown in FIGS. 1 and 2 indicate the poles of the electromagnet 52 after an electric current is supplied thereto. As shown, when the fan 1 operates in a normal state, no electricity is supplied to the electromagnet 52, and the magnetic member 512 located at one side of the brake plate 51 opposite to the brake pin 511 is magnetically attracted by the electromagnet 52 to thereby move the brake plate 51 toward the electromagnet 52, such that the elastic element 6 disposed between the brake plate 51 and the electromagnet 52 is elastically compressed. Since the magnetically attractive force between the magnetic member 512 and the electromagnet 52 is larger than the elastic force of the elastic element 6, the brake plate 51 and the brake pin 511 located at one side thereof are pulled away from the groove 31 provided at the free end of the rotating shaft 31, allowing the fan 1 to rotate smoothly.

Please refer to FIG. 3. When the fan 1 is powered off, the regenerative module 53 charges the electromagnet 52 by, for example, allowing the power storage element 532 to supply power instantly, so that the electromagnet 52 has an electric current instantly supplied thereto to produce magnetic poles. At this point, the electromagnet 52 produces a reverse magnetic force instantly, which repels the magnetic member 512 that is initially magnetically attracted to the electromagnet 52. Meanwhile, the initially compressed elastic element 6 releases its elastic force, which together with the magnetic repelling force pushes the magnetic member 512 and the brake plate 51 toward the rotating shaft 31 until the brake pin 511 on the brake plate 51 is correspondingly engaged with the groove 311 at the free end of the rotating shaft 31 of the fan 1. With the engagement of the brake pin 511 with the groove 311, the power-off fan 1 can reduce or even avoid the time of inertial rotation to achieve improved braking effect.

Further, the fan braking structure of the present invention can prevent the power-off fan 1 from rotating due to disturbed surrounding air flow, or prevent the formation of chaotic air flow by any inertially rotation of the power-off fan 1. According to the above description, it can be found the braking structure 5 of the present invention can be triggered in one shot for use, and can be applied to general fans so long as the fans have a groove provided at the free end of their rotating shaft. Therefore, the present invention has the advantage of being universally usable with any type of existing fans.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A fan braking structure, comprising:
   a fan including a frame, a fan impeller and a stator; the frame including an upright bearing cup, and the stator being externally fitted around the bearing cup to be located corresponding to the fan impeller; and the fan impeller including a rotating shaft vertically received in the bearing cup, an end of the rotating shaft being pivotally received in the bearing cup, and another end of the rotating shaft being a free end having a groove formed thereat;
   a braking structure including a regenerative module and a shell located at a lower part of the bearing cup; the shell being internally provided with a brake plate and an electromagnet; the brake plate being provided at one side with a protruded brake pin and at another opposite side with a magnetic member; and the regenerative module including an electrical connection section and a power storage element, and the electrical connection section being electrically connected to the fan; and
   an elastic element being disposed between and pressed against the brake plate and the electromagnet.

2. The fan braking structure as claimed in claim 1, wherein the brake pin of the braking structure and the groove on the rotating shaft of the fan have mating male and female configurations to be fitly and detachably engaged with each other; and wherein the regenerative module of the braking structure is selected from the group consisting of a capacitor, a battery and an accumulator, and the elastic element is selected from the group consisting of a compression spring and a conical spring.

3. The fan braking structure as claimed in claim 1, wherein the brake plate has a non-circular external shape and the shell has a corresponding non-circular internal spatial shape to prevent the brake plate from rotating radially while moving axially in the shell.

4. The fan braking structure as claimed in claim 1, wherein the fan internally includes a plurality of blades, which respectively have an end connected to the frame and another end connected to the bearing cup.

5. The fan braking structure as claimed in claim 1, wherein the magnetic member is a permanent magnet.

\* \* \* \* \*